US009652323B2

(12) United States Patent
Minzoni et al.

(10) Patent No.: US 9,652,323 B2
(45) Date of Patent: *May 16, 2017

(54) COMPUTER MEMORY ACCESS

(71) Applicant: XI'AN UNIIC SEMICONDUCTORS CO., LTD., Xi'an (CN)

(72) Inventors: Alessandro Minzoni, Xi'an (CN); Ni Fu, Xi'an (CN)

(73) Assignee: XI'AN UNIIC SEMICONDUCTORS CO., LTD., Xi'an (CN)

( * ) Notice: Subject to any disclaimer, the term of this patent is extended or adjusted under 35 U.S.C. 154(b) by 43 days.

This patent is subject to a terminal disclaimer.

(21) Appl. No.: 14/528,814

(22) Filed: Oct. 30, 2014

(65) Prior Publication Data

US 2015/0121171 A1    Apr. 30, 2015

(30) Foreign Application Priority Data

Oct. 31, 2013 (CN) .......................... 2013 1 0537688

(51) Int. Cl.
*G11C 29/00* (2006.01)
*G06F 11/10* (2006.01)

(52) U.S. Cl.
CPC ................ *G06F 11/1048* (2013.01)

(58) Field of Classification Search
CPC .................................................. G06F 11/1048
See application file for complete search history.

(56) References Cited

U.S. PATENT DOCUMENTS

| 2008/0133985 | A1* | 6/2008 | Riho | ................... G06F 11/1012 714/719 |
| 2013/0275830 | A1* | 10/2013 | Park | ..................... H03M 13/09 714/758 |
| 2015/0121172 | A1* | 4/2015 | Minzoni | ............. G06F 11/1048 714/766 |
| 2015/0378826 | A1* | 12/2015 | Zhang | ............... H03M 13/2942 714/766 |

FOREIGN PATENT DOCUMENTS

| CN | 1924820 A | 3/2007 |
| CN | 103187104 A | 7/2013 |

\* cited by examiner

*Primary Examiner* — Guy Lamarre
(74) *Attorney, Agent, or Firm* — Fish & Richardson P.C.

(57) ABSTRACT

A computer memory access method includes: receiving external data with a prefetching length, the external data having an unmasked first data portion and a masked second data portion; writing the unmasked first data portion to a corresponding data storage unit of a computer memory by a writing unit and reading a third data portion corresponding to the masked second data portion from the data storage unit by a reading unit; producing modified external data by merging the unmasked first data portion and the third data portion in place of the masked second data portion; generating parity bits from the modified external data by an error correction code encoding circuit according to a given rule; and then writing the parity bits to a parity bit storage unit of the computer memory by the writing unit, in substitution of previous information in the parity bit storage unit.

16 Claims, 3 Drawing Sheets

COMPUTER MEMORY ACCESS

CROSS-REFERENCE TO RELATED APPLICATION

This application claims priority under 35 U.S.C. §119 to Chinese Patent Application No. CN 201310537688.2, filed on Oct. 31, 2013. The contents of this priority application are hereby incorporated by reference in their entirety.

TECHNICAL FIELD

The present invention relates to computer memory access.

BACKGROUND

Since digital signal may be interfered in the process of transmission, there can be error in the transmitted data. Thus, at the receiving end, a false judgment may possibly occur.

In order to solve this problem, some parity bits can be added to the data sequence by an Error Correction Code (ECC) encoding circuit at the sending end, in order to detect and correct the erroneous data. It has been shown that numerous algorithms can support ECC, such as the common Hamming code, in which 8-bit data needs 4 parity bits and 64-bit data needs 7 parity bits. Thus, a proper algorithm may be selected according to the data length and the number of the data bits which need detection and correction.

As to different Double Data Rate (DDR) structures (DDR1/2/3), the data prefetching lengths for the typical stream in-and-out data reading are 32-bit, 64-bit and 128-bit. A reasonable and compromising solution is to use 7 parity bits or 8 parity bits for a 64-bit data (according to different ECC algorithms), as shown in FIGS. 1 and 2.

Nevertheless, as the presence of the Data Mask (DM), it is not easy for the DRAM to realize detection and correction functions. That is, when external data are written to DRAM, since one or more Bytes may be masked off, the data previously stored in the storage unit will not be overwritten. In this way, the ECC encoding process will not generate parity bits successfully, as shown in FIG. 3.

In order to solve this problem, the simplest method is to split 64-bit data into 8 groups and each group consists of 8-bit data (one Byte), precisely corresponding to the mask length of DM, so as not to be effected by DM. Nevertheless, since each 8-bit data needs 4 parity bits, making the area of the whole storage array increase by 50%, the cost of DRAM is significantly increased. Therefore, it desperately needs a solution to address the problems and defects brought out by DM.

SUMMARY

One aspect of the invention features a computer memory access method, including: receiving external data with a prefetching length, the external data having an unmasked first data portion and a masked second data portion; writing the unmasked first data portion to a corresponding data storage unit of a computer memory by a writing unit, and reading a third data portion corresponding to the masked second data portion from the data storage unit by a reading unit; producing modified external data by merging the unmasked first data portion and the third data portion in place of the masked second data portion; generating parity bits from the modified external data by an error correction code encoding circuit according to a given rule; and then writing the parity bits to a parity bit storage unit of the computer memory by the writing unit, in substitution of previous information in the parity bit storage unit.

Another aspect of the invention features a computer memory access method comprising the following steps:

1) receiving external data, and judging whether there is data mask in the external data; if there is no data mask in the external data, going on to step 2; and if there is data mask in the external data, dividing the external data into an unmasked first data portion and a masked second data portion and going on to step 3;

2) writing the external data to the data storage unit of a memory by a writing unit, generating parity bits from the external data by an error correction code encoding circuit according to a given rule, and respectively writing the external data and the parity bits to the data storage unit and the parity bit storage unit by the writing unit; and 3) writing the unmasked first data portion to the corresponding data storage unit of a computer memory by a writing unit, and reading a third data portion corresponding to the masked second data portion from the data storage unit of the memory by a reading unit; merging the unmasked first data portion and the third data portion substituting for the masked second data portion into modified external data; generating modified parity bits from the modified external data by an error correction code encoding circuit according to a given rule; writing the modified parity bits to a parity bit storage unit of the memory by the writing unit, to substitute for previous information in the parity bit storage unit of the memory.

As used herein, "the corresponding data storage unit" in the phrase "writing the unmasked first data portion to the corresponding data storage unit of the memory" refers to the data storage unit of the memory into which the first data portion is supposed to be written when there is no data mask.

As used herein, "a third data portion" in the phrase "reading a third data portion corresponding to the masked second data portion from the data storage unit of the memory by a reading unit" refers to the data portion in a data storage unit of the memory into which the second data portion is supposed to be written when there is no data mask.

Note that the terms "unmasked" and "without being masked off" can be used interchangeably, and the terms "masked" and "being masked off" can be used interchangeably.

In some embodiments, the unmasked first data portion and the masked second data portion are denoted by data mask signals, or the data mask signal is used to judge whether there is data mask in the external data. In some examples, the unmasked first data portion is denoted by a data mask signal with a value of 0, and the masked second data portion is denoted by a data mask signal with a value of 1.

In some implementations, the prefetching length is 64-bit, and each 8-bit of the external data in an order of the lower bits to the higher bits corresponds to one data mask signal. When the value of the data mask signal denoting the $n^{th}$ 8-bit of the external data is 1, the masked second data portion of the external data is from the $8n-7^{th}$ bit to the $8n^{th}$ bit, where n is an integer, and $0<n<9$. When merging, if n=1, the $8n+1^{th}$ to the $64^{th}$ bit of the external data and the data in the data storage unit of the memory are correspondingly merged; if $1<n<8$, the $1^{st}$ to the $8n-8^{th}$ bit and the $8n+1^{th}$ to the $64^{th}$ bit of the external data and the data in the data storage unit of the memory are correspondingly merged; if n=8, the $1^{st}$ to the $8n-8^{th}$ bit of the external data and the data in the data storage unit of the memory are correspondingly merged.

As used herein, "correspondingly merged" means that the external data and the data in the data storage unit of the memory are merged in their previously order of lower bits to higher bits.

In some cases, the prefetching length is 64-bit, each 8-bit of the external data in an order of the lower bits to the higher bits corresponds to one data mask signal. When the value of the data mask signal denoting the $m^{th}$ 8-bit and the value of the data mask signal denoting the $n^{th}$ 8-bit of the external data are both 1, the masked second data portion of the external data are from the $8m-7^{th}$ bit to the $8m^{th}$ bit and from the $8n-7^{th}$ bit to the $8n^{th}$ bit, where m and n are integers, and $0<m<n<9$. When merging, if $m\neq 1$ and $n\neq 8$, the $1^{st}$ to the $8(m-1)^{th}$ bit, the $8m+1^{th}$ to the $8(n-1)^{th}$ bit and the $(8n+1)^{th}$ to the $64^{th}$ bit of the external data and the data in the data storage unit of the memory are correspondingly merged; if $m=1$ and $n=8$, the $9^{th}$ to the $8(n-1)^{th}$ bit and the $8n+1^{th}$ to the $64^{th}$ bit of the external data and the data in the data storage unit of the memory are correspondingly merged; if $m\neq 1$ and $n=8$, the $1^{st}$ to the $8(m-1)^{th}$ bit and the $8m+1^{th}$ to the $56^{th}$ bit of the external data and the data in the data storage unit of the memory are correspondingly merged; if $m=1$ and $n=8$, the $9^{th}$ to the $56^{th}$ bit of the external data and the data in the data storage unit of the memory are correspondingly merged.

The prefetching length can be 32-bit, 64-bit or 128-bit. The error correction code encoding circuit can be a Hamming code encoding circuit.

A third aspect of the present invention features a computer memory error correction method by means of reading instead of writing, comprising the following steps:

1) receiving external data and judging whether there is data mask in the external data; if there is data mask, going on to step 2; and if there is no data mask, going on to step 3;

2) as there is data mask, writing the unmasked external data to a storage array of a computer memory, and in the meantime reading data corresponding to the masked external data from the storage array, then merging the external data written to the storage array and the data read from the storage array, generating corresponding parity bits from the merged data by an error correction code encoding circuit according to a given rule, and writing the merged data and the corresponding parity bits to the storage array and completely substituting for previous information stored in the storage array; and 3) as there is no data mask, directly writing the external data to the storage array, generating the corresponding parity bits from the external data by the error correction code encoding circuit according to a given rule, and writing the external data and the corresponding parity bits to the storage array and completely substituting for the previous information stored in the storage array.

A fourth aspect of the invention features a computer memory access method in which the judgment of whether there is data mask in the external data may not be performed, and the following steps are directly performed: receiving the external data where there is data mask, writing unmasked external data to the storage array, and in the meantime reading the data corresponding to masked external data from the storage array, then merging the external data written to the storage array and the data read from the storage array, generating corresponding parity bits from the merged data by an error correction code encoding circuit according to a given rule, and writing the merged data and the generated corresponding parity bits to the storage array and completely substituting for the previous information stored in the storage array.

Another aspect of the invention features a computer-readable storage medium coupled to one or more processors and having instructions stored thereon which, when executed by the one or more processors, cause the one or more processors to perform operations in accordance with implementations of the methods provided herein.

Other aspects of the invention feature a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Processors, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, a portable storage device (e.g., a universal serial bus (USB) flash drive), or other digital electronic devices, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Particular embodiments of the subject matter described in the invention can be implemented so as to realize one or more of the following advantages. A computer memory access method can address problems that, due to the presence of the DM in the existing ECC encoding process, the encoding cannot smoothly proceed and thus the parity bits cannot be generated, or the area of the storage array needs to be increased even if the parity bits are generated. A computer memory error correction method by means of reading instead of writing can eliminate the effect of data mask on the ECC and can reuse the existing reading-writing circuit to which merely the control of data mask to reading should be introduced.

Other advantages and advantageous embodiments of the subject-matter of the invention will be appreciated from the description, the claims and the drawings. The features mentioned above and those set out below may also be used individually per se or together in any combination. The embodiment shown and described is not intended to be understood to be a conclusive listing but is instead of exemplary character for describing the invention. The Figures of the drawings show the subject-matter in a schematic manner and are not intended to be understood to be to scale.

DETAILED DESCRIPTION

Figure 1:
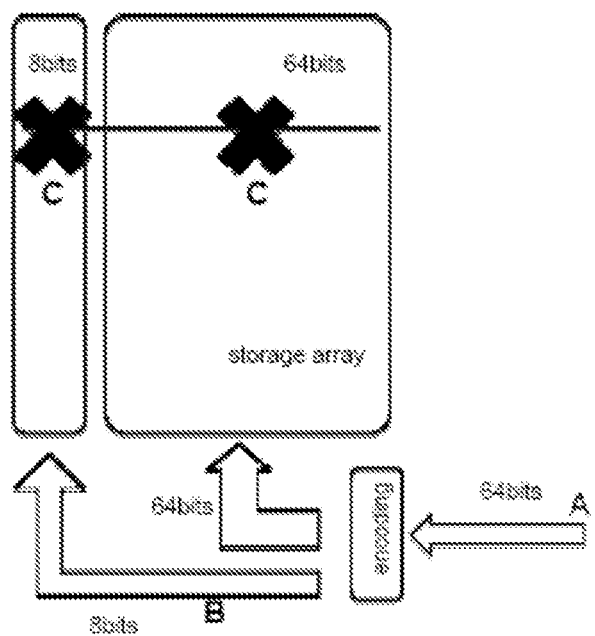
FIG. 1 is a flow chart of an existing writing process of ECC external data.

With reference to FIG. 1, the existing ECC encoding process can proceed in accordance with the following steps: First, the 64-bit external data are directly written (see A in FIG. 1). Second, 7 parity bits or 8 parity bits (see B in FIG. 1, as an example, the 8 parity bits are shown in FIG. 1) are generated from the 64-bit external data by an ECC encoding circuit according to a given rule. The given rule is a specific ECC algorithm. That is to say, ECC encoding circuit generates parity bits according to the ECC algorithm practically employed. The parity bits are used to detect and correct the data. Third, the new 64-bit data and the 7 parity bits or 8 parity bits are written to the storage array and completely substitute for the previously information stored in the storage array (see C in FIG. 1).

Figure 2:
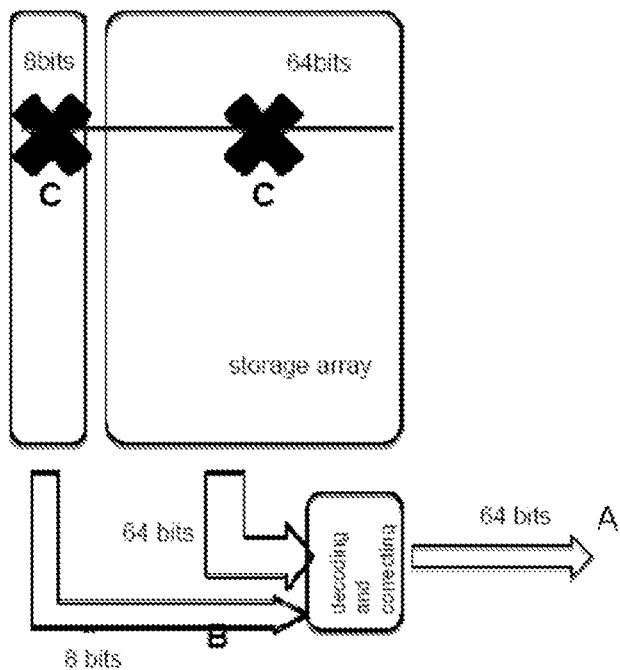
FIG. 2 is a flow chart of an existing reading process of ECC external data.

With reference to FIG. 2, the existing ECC decoding and correcting proceed in accordance with the following steps: First, the 64-bit data and 7 parity bits or 8 (see C in FIG. 2, as an example, the 8 parity bits are shown in FIG. 2) parity bits are read from the storage array. Second, the parity bits will decode and judge whether there are errors in the data according to a give rule. If there is an error, the parity bits will judge which bit is error and correct the erroneous data (see B in FIG. 2). The rule used herein corresponds to the rule used during the encoding process in FIG. 1. Third, the decoded data is read (see A in FIG. 2).

Figure 3:
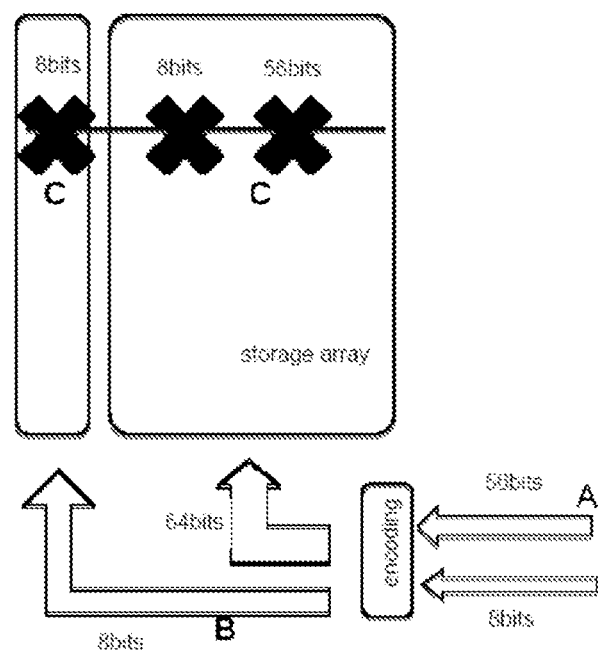
FIG. 3 is a flow chart of an existing writing process of ECC external data when there is data mask.

With reference to FIG. 3, when there is data mask, the existing ECC encoding will proceed in accordance with the following steps. Nevertheless, it should be understood that now ECC encoding cannot work properly when there is data mask.

First, the 56-bit data of the external 64-bit data are written to the storage array (see A in FIG. 3), and the remaining 8-bit data is masked off and is not written to the storage array. Second, the parity bits are still generated from the external 64-bit data (see B in FIG. 3). Third, in the storage array, the 56-bit data of the 64-bit data are substituted by the external data written into the storage array, and the remaining 8-bit data still keep their original information. As at this time, the parity bits are generated from the external 64-bit data, they are totally error parity bits for the 64-bit data (56-bit external data plus 8-bit original data) in the storage array.

Hereinafter, the invention will be described in detail with reference to FIG. 4 and the examples. When there is a data mask, the external data can be divided into two portions: a portion without being masked off or an unmasked portion, as shown by A in FIG. 4; and a portion being masked off or a masked portion, as shown by B in FIG. 4.

The unmasked external data portion and the masked external data portion are denoted by the data mask signals (DM signals). For example, the unmasked external data portion is denoted by a data mask signal with a value of 0, and the masked external data portion is denoted by a data mask signal with a value of 1. It should be understood that the unmasked external data portion can also be denoted by a data mask signal with a value of 1, and the masked external data portion can be featured by a data mask signal with a value of 0.

Figure 4:
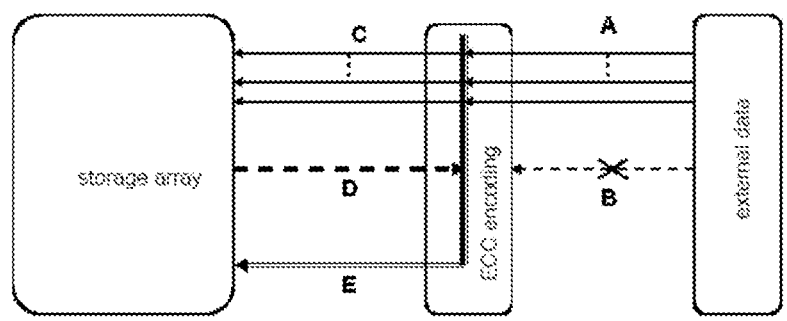
FIG. 4 is a schematic diagram representing a method and system relating to the present invention.

As to the unmasked portion A, it can be directly written to the storage array (such as the storage array C in FIG. 4). As to the masked portion, it shall be read rather than be written. The data corresponding to the masked portion in the storage unit are read from the storage array, as shown by D in FIG. 4. The data A and D are ECC encoded, and the encoding result E is send to the storage array. In this way, it is ensured that the data and the ECC stored in the same word line are corresponding to each other, solving the technical problems brought out by the DM.

Figure 5:
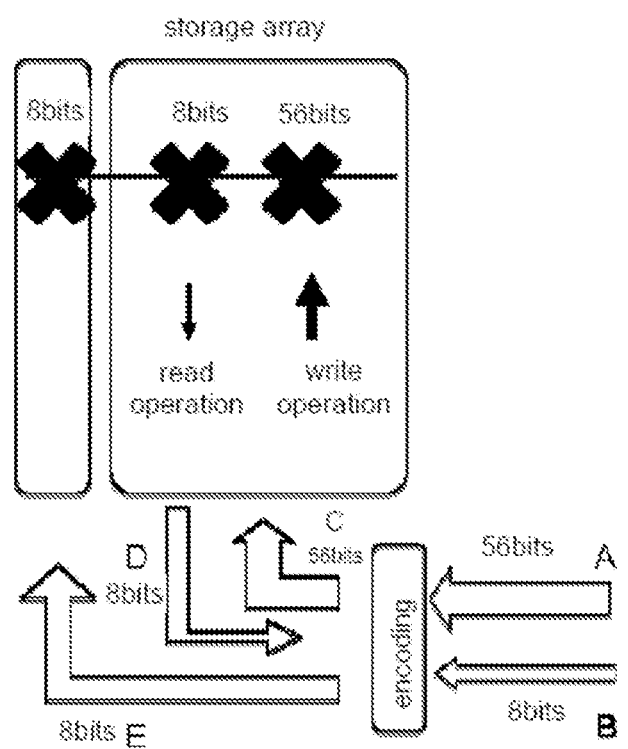
FIG. 5 is a flow chart of reading/writing ECC external data when there is a data mask.

As shown in FIG. 5, if the example of FIG. 3 is still used, the solution can be interpreted by FIG. 5. The 56-bit external data A are not masked off and are written to the storage array C; the 8-bit external data B are masked off and the corresponding 8-bit data D are read from the storage array; and the data A and the data D are encoded by the ECC to generate E which is written to the storage array.

For the convenience of illustration, in FIG. 5, merely one Byte (8 bits) being masked off is shown, and the data portion B (8 bits) being masked off lies at the beginning or the end of the data portion A (8 bits) without being masked off.

Nevertheless, it should be understood that the data portion being masked off can be not limited to one Byte, and the data portion B being masked off can be interlaced with the data portion A being masked off. This can be denoted by the data mask signal (DM signal).

In one example, the external data are 64-bit, and each 8-bit of the external data in an order of the lower bits to the higher bits corresponds to one data mask signal. When the data mask signal denoting the $n^{th}$ Byte (8-bit) of the external data is effective, the $8n-7^{th}$ bit to the $8n^{th}$ bit of the external data will be masked off (wherein n is an integer, and $0<n<9$). When merging, if n=1, the $8n+1^{th}$ to the $64^{th}$ bit of the external data and the data in the data storage unit of the memory are correspondingly merged. If $1<n<8$, the $1^{st}$ to the $8n-8^{th}$ bit and the $8n+1^{th}$ to the $64^{th}$ bit of the external data and the data in the data storage unit of the memory are correspondingly merged. If n=8, the $1^{st}$ to the $8n-8^{th}$ bit of the external data and the data in the data storage unit of the memory are correspondingly merged.

Specifically, for example, the 64-bit (8 Bytes) data corresponds to 8 DM signals, and one Byte data corresponds to one DM signal. It is supposed that the unmasked external data portion is denoted by a data mask signal with a value of 0 (i.e., the data mask signal is ineffective), and the masked external data portion is denoted by a data mask signal with a value of 1 (i.e., the data mask signal is effective). If the $3^{rd}$ Byte in an order of the lower bits to the higher bits of the 64-bit data is masked off (i.e., the data mask signal denoting the $3^{th}$ Byte (8-bit) of the external data is effective), the DM signal can be denoted by 00000100. When merging, the $1^{st}$ to the $16^{th}$ bit and the $25^{th}$ to the $64^{th}$ bit of the external data and the data in the data storage unit of the memory are correspondingly merged.

In another example, the external data are 64-bit, and each 8-bit of the external data in an order of the lower bits to the higher bits corresponds to one data mask signal. When both of the data mask signal denoting the $m^{th}$ Byte and the data mask signal denoting the $n^{th}$ Byte of the external data are effective, the $8m-7^{th}$ bit to the $8m^{th}$ bit and from the $8n-7^{th}$ bit to the $8n^{th}$ bit of the external data are masked off (wherein n and m are integers, and $0<m<n<9$). When merging, if $m\neq1$ and n≠8, the $1^{st}$ to the $8(m-1)^{th}$ bit, the $8m+1^{th}$ to the $8(n-1)^{th}$ bit and the $(8n+1)^{th}$ to the $64^{th}$ bit of the external data and the data in the data storage unit of the memory are correspondingly merged. If m=1 and n≠8, the $9^{th}$ to the $8(n-1)^{th}$ bit and the $8n+1^{th}$ to the $64^{th}$ bit of the external data and the data in the data storage unit of the memory are correspondingly merged. If m=1 and n=8, the $1^{st}$ to the $8(m-1)^{th}$ bit and the $8m+1^{th}$ to the $56^{th}$ bit of the external data and the data in the data storage unit of the memory are correspondingly merged. If m=1 and n=8, the $9^{th}$ to the $56^{th}$ bit of the external data and the data in the data storage unit of the memory are correspondingly merged.

Specifically, for example, if the $2^{nd}$ Byte and the $5^{th}$ Byte in an order of the lower bits to the higher bits of the 64-bit data are masked off (i.e., the data mask signals denoting the $2^{nd}$ Byte and the $5^{th}$ Byte of the external data are respectively effective), the DM signal can be denoted by 00010010. When merging, the $1^{st}$ to the $8^{th}$ bit, the $17^{th}$ to $32^{nd}$ and the $41^{th}$ to the $64^{th}$ bit of the external data and the data in the data storage unit of the memory are correspondingly merged.

A number of embodiments of the invention have been described. Nevertheless, it will be understood that various modifications may be made without departing from the spirit and scope of the invention. Accordingly, other embodiments are within the scope of the following claims.

What is claimed is:
1. A computer memory access method, comprising:
receiving external data with a prefetching length, the external data having an unmasked first data portion and a masked second data portion;
writing the unmasked first data portion to a corresponding data storage unit of a computer memory by a writing unit, and reading a third data portion corresponding to the masked second data portion from the data storage unit of the computer memory by a reading unit;
producing modified external data by merging the unmasked first data portion and the third data portion in place of the masked second data portion;
generating parity bits from the modified external data by an error correction code encoding circuit according to a given rule; and then
writing the generated parity bits to a parity bit storage unit of the computer memory by the writing unit, in substitution of previous information in the parity bit storage unit.

2. The computer memory access method of claim 1, wherein the unmasked first data portion and the masked second data portion are denoted by data mask signals.

3. The computer memory access method of claim 2, wherein the unmasked first data portion is denoted by a data mask signal with a value of 0, and the masked second data portion is denoted by a data mask signal with a value of 1.

4. The computer memory access method of claim 3, wherein the prefetching length is 64-bit, and each 8-bit of the external data in an order of lower bits to higher bits corresponds to one data mask signal,
wherein, when the value of the data mask signal denoting the $n^{th}$ 8-bit of the external data is 1, the masked second data portion of the external data is from the $8n-7^{th}$ bit to the $8n^{th}$ bit,
wherein n is an integer, and 0<n<9, and
wherein, when merging,
if n=1, the $8n+1^{th}$ to the $64^{th}$ bit of the external data and the data in the data storage unit of the computer memory are correspondingly merged,
if 1<n<8, the $1^{st}$ to the $8n-8^{th}$ bit and the $8n+1^{th}$ to the $64^{th}$ bit of the external data and the data in the data storage unit of the computer memory are correspondingly merged, and
if n=8, the $1^{st}$ to the $8n-8^{th}$ bit of the external data and the data in the data storage unit of the computer memory are correspondingly merged.

5. The computer memory access method of claim 3, wherein the prefetching length is 64-bit, and each 8-bit of the external data in an order of lower bits to higher bits corresponds to one data mask signal,
wherein, when the value of the data mask signal denoting the $m^{th}$ 8-bit and the value of the data mask signal denoting the $n^{th}$ 8-bit of the external data are both 1, the masked second data portion of the external data are from the $8m-7^{th}$ bit to the $8m^{th}$ bit and from the $8n-7^{th}$ bit to the $8n^{th}$ bit,
wherein m and n are integers, and 0<m<n<9, and
wherein, when merging,
if m≠1 and n≠8, the $1^{st}$ to the $8(m-1)^{th}$ bit, the $8m+1^{th}$ to the $8(n-1)^{th}$ bit and the $(8n+1)^{th}$ to the $64^{th}$ bit of the external data and the data in the data storage unit of the memory are correspondingly merged,
if m=1 and n≠8, the $9^{th}$ to the $8(n-1)^{th}$ bit and the $8n+1^{th}$ to the $64^{th}$ bit of the external data and the data in the data storage unit of the computer memory are correspondingly merged,
if m≠1 and n=8, the $1^{st}$ to the $8(m-1)^{th}$ bit and the $8m+1^{th}$ to the $56^{th}$ bit of the external data and the data in the data storage unit of the computer memory are correspondingly merged, and
if m=1 and n=8, the $9^{th}$ to the $56^{th}$ bit of the external data and the data in the data storage unit of the computer memory are correspondingly merged.

6. The computer memory access method of claim 1, wherein the prefetching length is 32-bit, 64-bit or 128-bit.

7. The computer memory access method of claim 1, wherein the error correction code encoding circuit is a Hamming code encoding circuit.

8. A computer memory access method comprising:
receiving external data;
determining whether there is data mask in the external data;
in response to determining that there is no data mask in the external data:
writing the external data to a data storage unit of a computer memory by a writing unit;
generating parity bits from the external data by an error correction code encoding circuit according to a given rule; and
respectively writing the external data and the parity bits to the data storage unit and a parity bit storage unit of the computer memory by the writing unit;
otherwise, in response to determining that there is data mask in the external data:
dividing the external data into an unmasked first data portion and a masked second data portion;
writing the unmasked first data portion to the corresponding data storage unit of the computer memory by a writing unit, and reading a third data portion corresponding to the masked second data portion from the data storage unit of the computer memory by a reading unit;
generating modified external data by merging the unmasked first data portion and the third data portion in place of the masked second data portion;

generating parity bits from the modified external data by an error correction code encoding circuit according to a given rule; and writing the generated parity bits to the parity bit storage unit of the computer memory by the writing unit, in substitution of previous information in the parity bit storage unit.

9. The computer memory access method of claim 8, wherein the data mask signal is used to judge whether there is data mask in the external data.

10. The computer memory access method of claim 9, wherein the unmasked first data portion is denoted by a data mask signal with a value of 0, and the masked second data portion is denoted by a data mask signal with a value of 1.

11. The computer memory access method of claim 9, wherein the prefetching length is 64-bit, and each 8-bit of the external data in an order of lower bits to higher bits corresponds to one data mask signal, wherein, when the value of the data mask signal denoting the $n^{th}$ 8-bit of the external data is 1, the masked second data portion of the external data is from the $8n-7^{th}$ bit to the $8n^{th}$ bit, wherein n is an integer, and 0<n<9, and wherein, when merging, if n=1, the $8n+1^{th}$ to the $64^{th}$ bit of the external data and the data in the data storage unit of the computer memory are correspondingly merged, if 1<n<8, the $1^{st}$ to the $8n-8^{th}$ bit and the $8n+1^{th}$ to the $64^{th}$ bit of the external data and the data in the data storage unit of the memory are correspondingly merged, and if n=8, the $1^{st}$ to the $8n-8^{th}$ bit of the external data and the data in the data storage unit of the computer memory are correspondingly merged.

12. The computer memory access method of claim 9, wherein the prefetching length is 64-bit, and each 8-bit of the external data in an order of lower bits to higher bits corresponds to one data mask signal, wherein, when the value of the data mask signal denoting the $m^{th}$ 8-bit and the value of the data mask signal denoting the $n^{th}$ 8-bit of the external data are both 1, the masked second data portion of the external data is from the $8m-7^{th}$ bit to the $8m^{th}$ bit and from the $8n-7^{th}$ bit to the $8n^{th}$ bit, wherein m and n are integers, and 0<m<n<9, and wherein, when merging, if m≠1 and n≠8, the $1^{st}$ to the $8(m-1)^{th}$ bit, the $8m+1^{th}$ to the $8(n-1)^{th}$ bit and the $8n+1^{th}$ to the $64^{th}$ bit of the external data and the data in the data storage unit of the memory are correspondingly merged, if m=1 and n≠8, the $9^{th}$ to the $8(n-1)^{th}$ bit and the $8n+1^{th}$ to the $64^{th}$ bit of the external data and the data in the data storage unit of the memory are correspondingly merged, if m≠1 and n=8, the $1^{st}$ to the $8(m-1)^{th}$ bit and the $8m+1^{th}$ to the $56^{th}$ bit of the external data and the data in the data storage unit of the computer memory are correspondingly merged, and if m=1 and n=8, the $9^{th}$ to the $56^{th}$ bit of the external data and the data in the data storage unit of the computer memory are correspondingly merged.

13. The computer memory access method of claim 8, wherein the prefetching length is 32-bit, 64-bit or 128-bit.

14. The computer memory access method of claim 8, wherein the error correction code encoding circuit is a Hamming code encoding circuit.

15. A computer memory error correction method, comprising:

receiving external data;

determining whether there is data mask in the received external data;

in response to determining that there is a data mask:

writing an unmasked portion of the external data to a storage array of a computer memory and reading data corresponding to a masked portion of the external data from the storage array; then merging the data written to the storage array and the data read from the storage array to produce merged data;

generating corresponding parity bits from the merged data by an error correction code encoding circuit according to a given rule; and writing the merged data and the corresponding parity bits to the storage array in complete substitution of previous information stored in the storage array;

otherwise, in response to determining that there is no data mask in the received external data:

directly writing the received external data to the storage array;

generating corresponding parity bits from the received external data by an error correction code encoding circuit according to a given rule; and writing the external data and the corresponding parity bits to the storage array in complete substitution of previous information stored in the storage array.

16. A computer memory error correction method, comprising:

receiving external data including data mask;

writing an unmasked portion of the received external data to a storage array of a computer memory, while reading data corresponding to a masked portion of the received external data from the storage array;

producing modified data by merging the external data written to the storage array and the data read from the storage array;

generating corresponding parity bits from the modified data by an error correction code encoding circuit according to a given rule; and then writing the modified data and the corresponding parity bits to the storage array in complete substitution of previous information stored in the storage array.

* * * * *